UNITED STATES PATENT OFFICE.

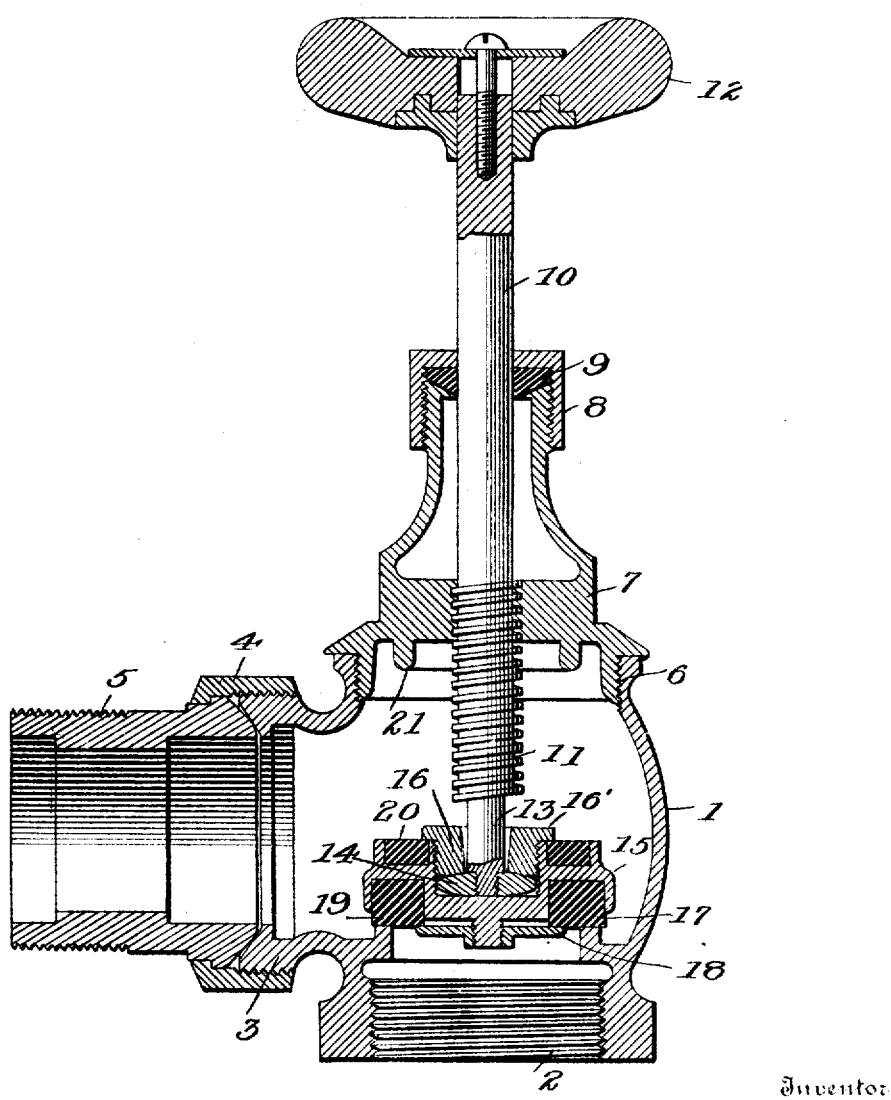

WILLIAM C. MARSH, OF DUNKIRK, NEW YORK, ASSIGNOR TO MARSH VALVE COMPANY, OF DUNKIRK, NEW YORK, A CORPORATION OF NEW YORK.

VALVE.

1,009,763.   Specification of Letters Patent.   Patented Nov. 28, 1911.

Application filed September 10, 1910. Serial No. 581,463.

*To all whom it may concern:*

Be it known that I, WILLIAM C. MARSH, a citizen of the United States, residing at Dunkirk, in the county of Chautauqua and State of New York, have invented new and useful Improvements in Valves, of which the following is a specification.

My invention relates to valves more especially adapted for use with radiators, and has for its object to provide a valve of novel construction embodying not only a main closure but also a closure for preventing leakage through the valve stem or stuffing box when the main valve is open.

In the accompanying drawing, the figure is a central vertical sectional view of my improved valve.

In the said drawing the reference numeral 1 denotes the body of a radiator valve, having the interiorly threaded inlet aperture 2 for the reception of the supply pipe, and the exteriorly threaded discharge 3, to which may be connected, by a union nut 4, a short threaded pipe section or nipple 5, for connection with a radiator. The upper side of the body 1 is apertured and interiorly screw-threaded at 6 to receive a bonnet piece 7, which in turn carries a packing nut 8 at its upper end, between which and the upper end of said bonnet piece a packing 9 is interposed.

Passing centrally through the packing nut 8, packing 9 and the bonnet piece 7 is a valve stem 10 provided intermediate its length with a right-hand screw thread 11, in threaded engagement with the bonnet piece 7 so that the stem 10 will move up and down in said bonnet piece when rotated by a suitable handle 12. At its lower end said stem 10 is reduced in size at 13, and has secured thereon, by a left hand screw, an enlarged nut 14, rounded on both its upper and under sides, as shown, over which fits a disk holder 15, the same being retained in position by an apertured nut 16, loosely surrounding the reduced lower end 13 of valve stem 10 and screwed into said disk holder 15 with a left hand screw thread. The lower surface of said disk holder 15 is recessed annularly to receive a suitable hard packing disk 17, which is retained in position by a washer 18, said packing disk being adapted to engage a valve seat 19 in the body 1 when said valve disk holder is in its lowermost position. The upper surface of said disk holder 15 has an annular recess adapted to receive a suitable hard packing disk 20, which, when said disk holder is in its uppermost position, contacts with an annular seat 21 formed on the bonnet piece 7 around the stem 10, said packing disk being retained in position by a flange 16' formed on the nut 16, as shown.

In operation a rotation to the right of stem 10 will, through thread 11, cause a bodily downward movement of stem 10 and disk holder 15 until packing disk 17 contacts with valve seat 19, thus closing the valve. In opening, the movement of stem 10 is reversed, and as the valve is opened the packing disk 20 comes in contact with its seat 21, thus preventing the escape of fluid through the bonnet piece 7.

To assemble the parts I first place the nut 16 in position on the lower reduced end 13 of stem 10; then screw the nut 14 thereon; and finally apply the disk holder 15 by screwing it onto the nut 16. By means of this construction I provide a rocking connection between the disk holder 15 and stem 10, which is afforded by the nut 14 rounded on its upper and under sides, so that both the packing disks 17 and 20 will seat snugly when brought against their respective seats.

Having thus described my invention, what I claim as new and desire to secure by Letters Patent is:—

1. A valve, embodying a casing, a longitudinally movable valve stem therein, oppositely disposed seats in said casing, a nut mounted on the lower end of said stem, an integral disk holder in said casing carrying oppositely disposed disks for engaging said seats and embracing said nut, and an apertured nut loosely surrounding said stem and in screw-threaded engagement with said disk holder, said apertured nut loosely engaging said first mentioned nut to retain said disk holder on said stem, the contacting surfaces of the parts being such that said disk holder is permitted a bodily rocking movement when moving into contact with either seat.

2. A valve, embodying a casing, a stem rotatable and bodily movable in said casing and having a reduced lower end, oppositely disposed seats in said casing, a nut having rounded upper and under sides mounted on the lower reduced end of said stem, an integral disk holder carrying oppositely disposed disks for engaging said seats and embracing said nut, and an apertured nut loosely surrounding said stem and in screw-threaded engagement with said disk holder, said apertured nut loosely engaging said first mentioned nut to retain said disk holder on said stem and engaging one of said disks to retain said disk in said disk holder.

In testimony whereof I have hereunto set my hand in the presence of two subscribing witnesses.

WILLIAM C. MARSH.

Witnesses:
 FRED. J. REED,
 V. L. R. MARSH.